METHOD AND DEVICE FOR SUPPORTING A CONVEYED TANK AGAINST ROLL AND PITCH

Original Filed Jan. 6, 1971 3 Sheets-Sheet 1

INVENTOR
JEAN H. ALLEAUME
BY
Kenyon & Kenyon Reilly Carr & Chapin
ATTORNEYS

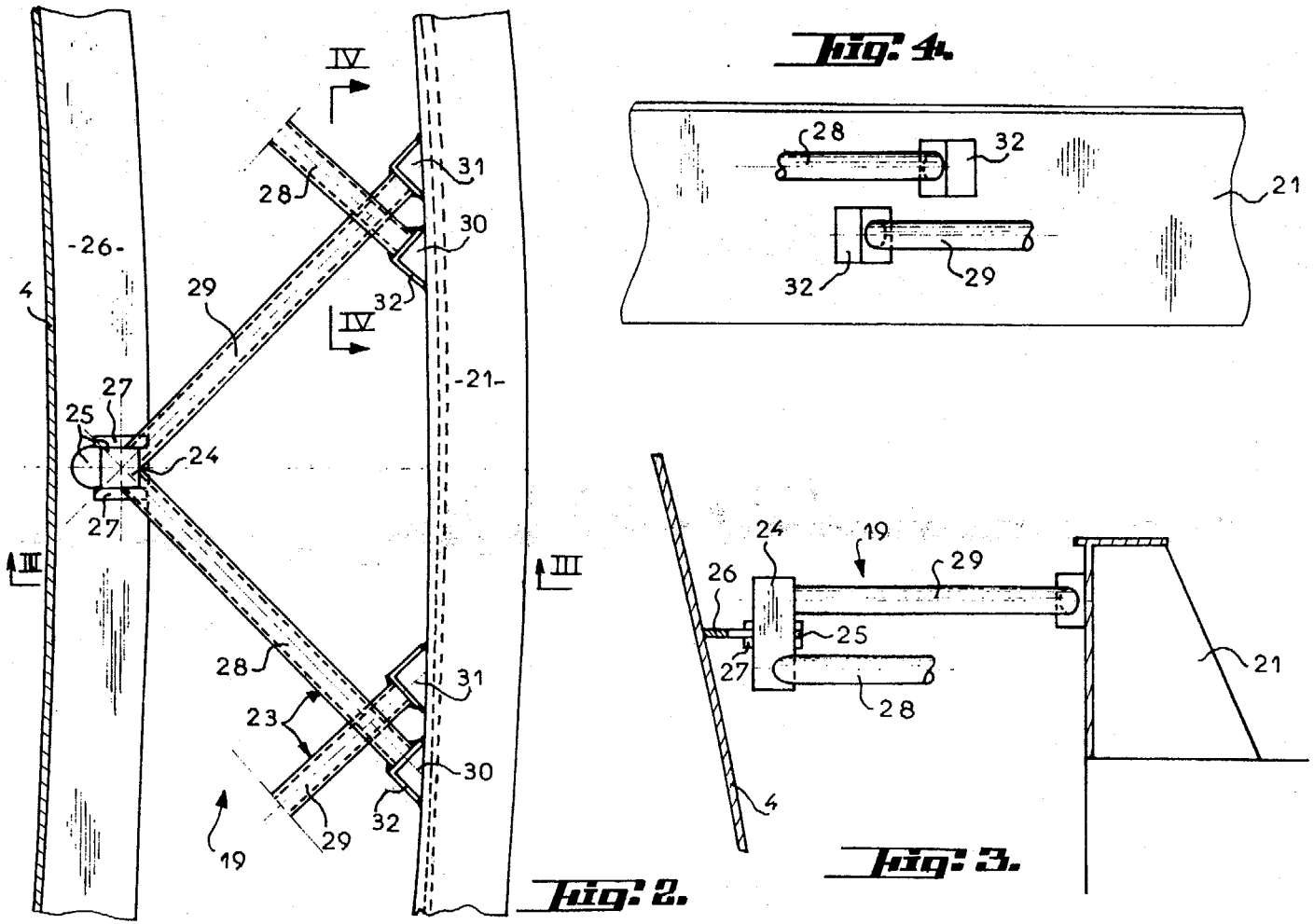
INVENTOR
JEAN H. ALLEAUME
BY
Kenyon & Kenyon Reilly Carr & Chapin
ATTORNEYS INVENTOR
JEAN H. ALLEAUME
BY
Kenyon & Kenyon Reilly Carr & Chapin
ATTORNEYS

United States Patent

Re. 28,411
Reissued May 6, 1975

28,411

METHOD AND DEVICE FOR SUPPORTING A CONVEYED TANK AGAINST ROLL AND PITCH

Jean H. Alleaume, Saint Cloud, France, assignor to Technigaz, Paris, France

Original No. 3,712,257, dated Jan. 23, 1973, Ser. No. 104,239, Jan. 6, 1971. Application for reissue June 27, 1973, Ser. No. 374,036

Claims priority, application France, Apr. 30, 1970, 7016004

Int. Cl. B63b *25/08*

U.S. Cl. 114—74 A 13 Claims

Matter enclosed in heavy brackets [ ] appears in the original patent but forms no part of this reissue specification; matter printed in italics indicates the additions made by reissue.

ABSTRACT OF THE DISCLOSURE

A method of compensating by means of external bearing reactions for the roll and pitch forces, a rigid shipborne tank movably suspended at discrete external points distributed along the periphery of the said tank and consisting in applying said bearing reactions, without creating any normal [effect] *efforts* onto said tank at discrete points along the tank periphery located in a same horizontal plane so as to be horizontal relative to said ship by being each parallel with the local plane tangent to the tank perpendicularly to the normal passing through the point of application of the bearing reaction considered.

The present invention relates generally to and has essentially for its object a method of compensating *for* [or] balancing and absorbing, by means of external bearing reactions, the forces produced by roll and/or pitch motions on a rigid storage tank or container being conveyed by a vehicle, as well as a supporting device for carrying out the said method, and the various applications and uses resulting from the working thereof and the systems, assemblies, structures, equipments and plants provided with such devices.

In patent application Ser. No. 834,337 filed on June 18, 1969 in the applicant's name, now U.S. Pat. No. 3,583,-352, there is disclosed a storage tank or container in particular a spherical tank or container, supported vertically by being movably suspended from a transportation vehicle at spaced external discrete points distributed all over the periphery of the tank for instance substantially in one and the same relative horizontal plane. It may be for instance a spherical storage tank intended to contain liquefied gases at very low temperatures, such as liquefied natural gases such as methane, and which is mounted in the hold of a cargo ship, vessel or boat. The said previous patent application provides for supporting devices against roll and pitch, distributed respectively along two large vertical orthogonal meridian circles which are respectively parallel with the longitudinal axis and the transverse axis of the vehicle or the ship or boat. This known arrangement is disadvantageous in that it necessitates the provision, in the vehicle frame or in the ship's hold or hull, of special stationary linking or tying structures solid with the ship's hull or with the frame of the vehicle in general for securing supports against roll and pitch; such special structures are costly and complicated.

This invention has mainly for its purpose to avoid the said disadvantage by creating a method of neutralizing the forces resulting from roll and pitch, enabling the said forces to be transmitted to the level of at least one and preferably two spaced horizontal planes, by means of the corresponding bearing reactions comprised in each horizontal plane. To this end, the method according to the invention is characterized in that it consists in applying the said bearing reactions, without creating any normal force, to the said storage tank at spaced discrete points distributed all over the periphery of the said tank, at least some of which are located in one end and the same relative horizontal plane and in such a manner as to be at least approximately horizontal with respect to the said vehicle by being each substantially parallel with the local plane tangential [to] *with* the tank in perpendicular relationship to the normal passing through the point of application of the bearing reaction considered.

According to another feature of the invention, and more particularly in the case of a storage tank having at least one geometrical axis of symmetry or of revolution which is at least substantially vertical with respect to the said vehicle, and having a relative horizontal or equatorial plane of symmetry, such as for instance a spherical or spheroidal storage tank suspended in particular substantially at the level of the said plane, the points of application of the said bearing reactions are distributed [into] *in* at least two sets located respectively in at least two relative, substantially horizontal planes extending substantially in symmetrical relationship on either side of the said horizontal plane of symmetry of the said tank, the points of application of one of said sets being for instance shifted in the peripheral direction with respect to those of the other said set.

Such an arrangement offers the advantage of considerably simplifying the stationary bearing structure serving to neutralize the roll and pitch forces to which the tank is subjected. Such improvements are therefore advantageous in that they allow more economic and easier construction while at the same time being undoubtedly efficient. By carefully avoiding any force normal to the tank, it is possible to reduce the dimensions of its structure, thus possibly enabling a considerable reduction in weight to be obtained.

The invention also relates to a device, in particular an auxiliary device, for supporting a tank against roll and/or pitch, the said device serving to carry out the aforementioned method and being associated with a system of main supports for movable and substantially vertical suspension. The said device is characterized in that it comprises at least one system of spaced stationary bearing members distributed all over the periphery of the said tank by being located at least approximately in at least one and the same relative horizontal plane and each of which is substantially rigid or practically *not* [undeformable] *deformable* at least in the horizontal direction perpendicular to the local normal of the tank, passing through the bearing member considered by being so connected with the said tank that the latter is immobilized locally in the said direction, but is freely movable in at least the relative vertical, substantially normal or radial, plane passing through the said bearing member.

According to another feature of the invention, the said storage tank is connected to each said bearing member by an associtaed forced-guiding bearing solid with the said tank and co-operating with the said bearing member through bilateral sliding or rolling contact.

According to still another feature of the invention, each said guiding bearing comprises a guiding path forming a slide or the like, constituted by an elongated rectilinear recess forming a straight, substantially horizontal slit or slot, the mutually opposite edges or faces of which are substantially parallel and rectilinear or *flat* [plane] wherein the said associated normal vertical local plane is the longitudinal plane of symmetry whereas the associated stationary bearing member comprises at least one guiding element in the form of either at least one *skid* [skate] or at least one rotary roll or ball constantly [engaged in] *engaging* the said slide in sliding or rolling relationship [to] with said slide.

According to still another feature of the invention, there are provided at least two systems of said bearing members arranged for instance at two levels located in particular symmetrically on either side of the horizontal plane of symmetry of the tank, the said bearing members being for instance [shifted] *mutually offset* in the peripheral direction respectively from one level to the other.

The invention will be better understood and other purposes, features, details and advantages thereof will appear more clearly from the following explanatory description, with reference to the appended diagrammatic drawings given solely by way of example illustrating various forms of embodiment of the invention and wherein:

FIG. 2 is a fragmentary sectional view [to] *at* a larger scale, upon the line II—II of FIG. 1.

FIG. 3 is a fragmentary sectional view, partially broken away *taken* upon the line III—III of FIG. 2;

FIG. 4 is a fragmentary sectional view *taken* upon the line IV—IV of FIG. 2;

Figure 1:
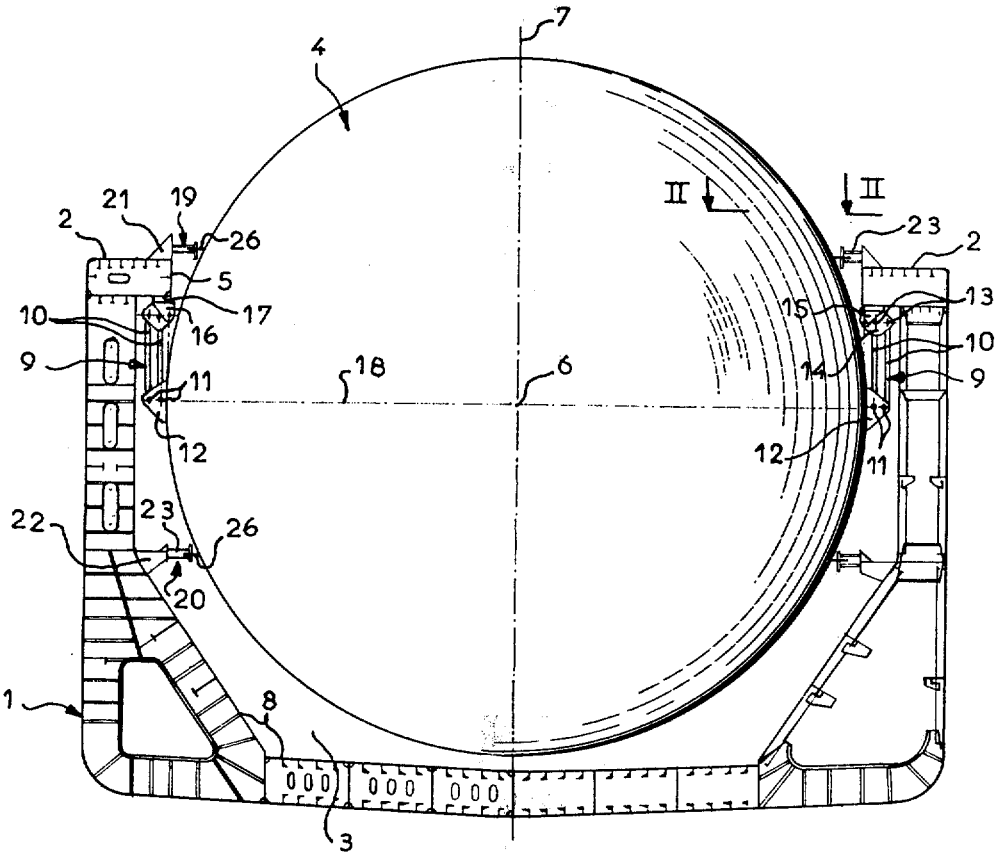
FIG. 1 is a cross-sectional view of a ship, vessel or boat conveying one or several spherical tanks equipped with a device according to the invention.

According to the example of embodiment illustrated in FIG. 1, the aforesaid transportation vehicle is constituted by a ship, vessel or boat, the double hull of which is indicated generally by the reference [digit] *numeral* 1, and comprises at its upper portion a main deck 2. In the hold 3 of the vessel are mounted one or several storage tanks or containers, for instance spherical tanks or containers 4 projecting for instance above the main deck 2 *with* [by] their upper portion passing through the corresponding hold hatchway 5. Each tank 4 has preferably its center 6 located in the medial longitudinal vertical plane 7 of the vessel. Each tank is for instance intended to contain liquefied gas at a very low temperature. In this case, the tank 4 as well as all *of* its support and suspension members with which it is connected are advantageously made from a noble steel which is resistant to low temperatures, such as for instance stainless steel or an equivalent metal, and the inner [wall] *walls* 8 of the hold 3 are advantageously covered on their exposed surface facing the tank, with a layer of suitable heat-insulating material.

Each tank is movably suspended from vertical suspension members 9 of the type described and illustrated for instance in the above-mentioned patent application. It is to be understood that the subject-matter of the present invention may be considered in combination with the suspension devices disclosed in the said prior patent application. Each suspension device 9 is constituted by a kind of hinged parallelogram arranged substantially in the meridian vertical local plane normal to the tank, i.e. passing through the vertical axis of revolution 7 of the latter and is composed of two parallel vertical rods 10 [hinged] *pivoted* respectively at their lower ends by means of two horizontal hinge pins 11 to a yoke 12 solid with the tank 4 and by their upper ends by means of two horizontal pins 13 to a yoke 14 which is itself hinged by a horizontal pin 15 to a stationary bracket 16 solid with a box-shaped annular structure 17 surrounding horizontally the tank 4 and secured under the main deck 2 i.e. [against] *adjacent to* the ceiling of the hold 3. Each yoke 12, 14 is constituted by two parallel vertical plates. The supports 9 are distributed horizontally about the tank 4 in spaced relationship [to] *with* one another and the lower yoke 12 is so secured to the tank 4 that the equatorial plane 18 of the tank passes substantially through both horizontal pins 11 of each yoke 12. The upper [hinge] *pivot* pins 13 and 15 are located substantially in one and the same horizontal plane and the [hinge] *pivot* pin 15 is located in the vertical plane tangential to the equatorial plane 18 of the tank 4 and perpendicular to the meridian vertical plane passing through the rods 10 for each suspension support 9.

Advantageously, there are provided two systems for preventing roll and pitch effects, namely, an upper system 19 and a lower system 20 placed respectively at two superposed levels which are symmetrical with respect to their horizontal plane of symmetry or equatorial plane 18 of the tank, the upper system 19 being preferably substantially at the level of the main deck 2 of the vessel. For the sake of simplification of the drawing, only two vertical suspension supports 9, two bearing members of the lower system 20 and two bearing members of the upper system 19, placed respectively on either side of the medial longitudinal vertical plane of the vessel, are shown, whereas the said supports and members are distributed horizontally about the tank 4 at their respective different levels.

Each system of bearing members 19, 20 is secured to a stationary annular structure 21, 22, the lower structure 22 being located in the hold 3 and solid with the hull 1 and surrounding horizontally the tank 4 in spaced relationship to the latter. As shown more particularly in FIGS. 2, 3 and 4, each of the bearing members 23 of each system 19, 20 comprises a guiding element 24 mounted *to roll* [rollingly] or [slidingly] *slide* in the horizontal and preferably also in the vertical direction in a guiding bearing 25 extending in a direction which is substantially radial or normal to the tank 4. All the guiding bearings of one and the same system of bearing members 19, or 20, i.e. those located at one and the same level, are advantageously carried by a substantially horizontal ring 26 solid with the tank 4 and surrounding the latter externally, each guiding bearing 25 being constituted for instance by a rectilinear recess provided in the said ring and the mutually opposite longitudinal edges of which, forming a guiding slide, are advantageously reinforced by members 27 considerably increasing the height of the guiding bearing surface.

Each bearing member 23 is advantageously constituted by a bracket support of substantially triangular, for instance, isosceles, configuration composed in particular of two overhanging rods 28, 29, connected respectively by one of their ends with the external stationary structure 21 or 22 spaced from the tank 4 respectively at two, at least horizontally spaced, points 30, 31 which are located respectively on either side of the associated local normal vertical plane forming the meridian or radial plane passing through the guiding element 24 and the guiding bearing 25. The rods 28, 29 converge towards and meet one another in the plane so as to be interconnected by the guiding element 24 forming the overhanging free apex of the said triangle.

In each system 19, 20, the bearing members are preferably substantially adjacent to one another as shown in FIG. 2, and the mutually adjacent rods 28, 29 of two successive bearing members 23 are connected with the stationary structure 21, 22 at points 30, 31 close to or coinciding with one another, so that each system of bearing members 19, 20 forms a structure having, as it were, a latticed or triangulated configuration. Both rods 28, 29 of each bearing member 23 have for instance at least their respective points 30, 31 of connection with the stationary structure 21, 22 located at two respectively different, superposed levels and the rods are advantageously substantially horizontal by being [shifted] *spaced* vertically with respect to one another, so as to be located on either side of the horizontal plane, or of the ring 26, containing the associated guiding bearing 25. Two adjacent rods 28, 29 of two successive bearing members 23 of one and the same system 19 or 20 are for instance [shifted] *spaced* vertically with respect to one another as shown in particular in FIGS. 3 and 4.

The guiding elements 24 pertaining to one of the systems 19 or 20 of bearing members 23 are preferably respectively [shifted] *spaced* in the peripheral direction with respect to the guiding elements of the other system, for instance, in such a manner that the guiding elements 24 of one system are respectively arranged in the *medial* [mediating] meridian vertical planes between two successive guiding elements 24 of the other system. Each said guiding element 24 is advantageously constituted by a sliding [skate] *skid* at least *that* [the] [portion] *portions of which engaging* [engaged in] the associated guiding slide 25 [of which] has a substantially prismatic lateral surface with a substantially vertical axis and with for instance a square or rectangular cross-section, and the height or vertical length of which is sufficient to ensure permanent guiding of any mutual relative vertical displacement of the said tank and/or the said guiding element 24.

Such relative mobility of the tank 4 in vertical *translatory motion* [translation] with respect to the guiding elements 24 may be caused in particular by the *elongation* [lengthening] of the suspension rods 10 of the vertical supports 9 resulting from the increase in weight of the tank during the filling thereof, whereas the relative mobility of the guiding elements 24 may result from a possible bending deformation of the bearing members or rods 23. Each rod 28, 29 of each said bearing member 23 may be rigidly secured at its mutually opposite ends to [respectively] the associated guiding element 24 and to the said stationary structure 21 or 22 *respectively*, for instance by welding. In this case, each guiding [skate] *skid* 24 is advantageously constituted by a body in the form of a rectangular or a square parallelepiped which is set by its two adjacent longitudinal edges respectively in the rods 28, 29 by being welded to the latter. At their opposite ends, the rods 28, 29 are each secured to the stationary structure 21, 22 for instance by welding through the medium of an interposed [shoe] *pad* or the like 32 which is advantageously constituted by an angle-piece or the like.

Generally, each bearing member 23 is advantageously in the shape of a right-angled isosceles triangle, the right-angle apex of which is constituted by its guiding element 24, so that the successive rods of one and the same system of bearing members are respectively perpendicular to one another.

Figure 6:
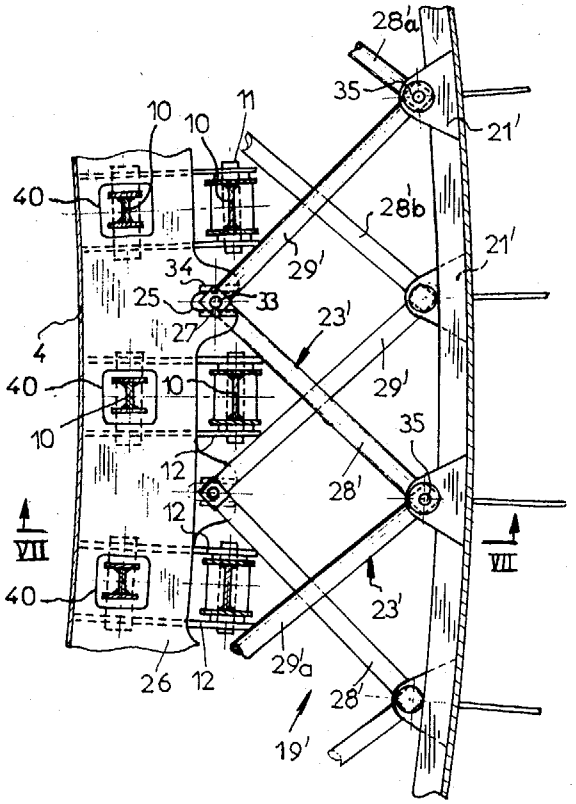
FIG. 6 is an enlarged fragmentary sectional view *taken* upon the line VI—VI of FIG. 7 of a portion of the device illustrated in FIG. 5.
Figure 7:
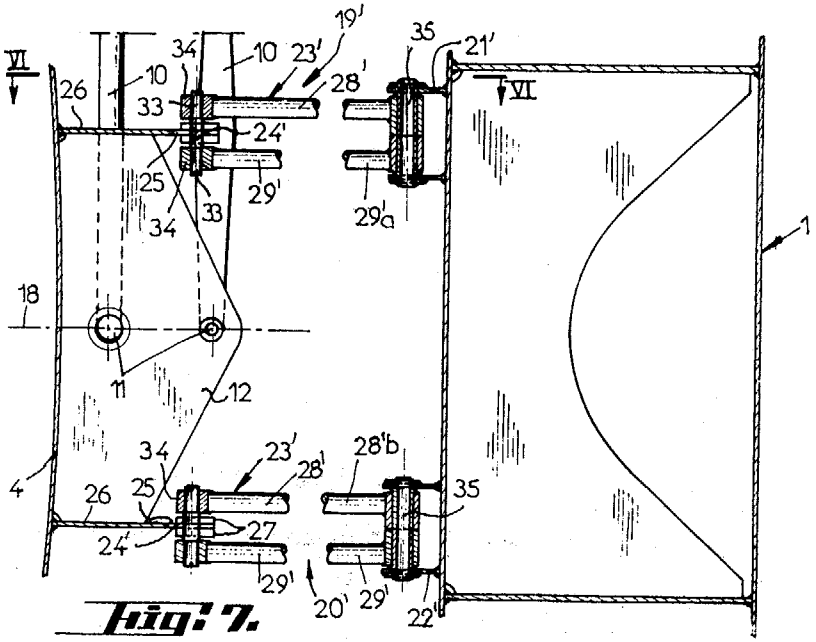
FIG. 7 is a fragmentary cross-sectional view, partially broken away, upon the line VII—VII of FIG. 6.
Figure 5:
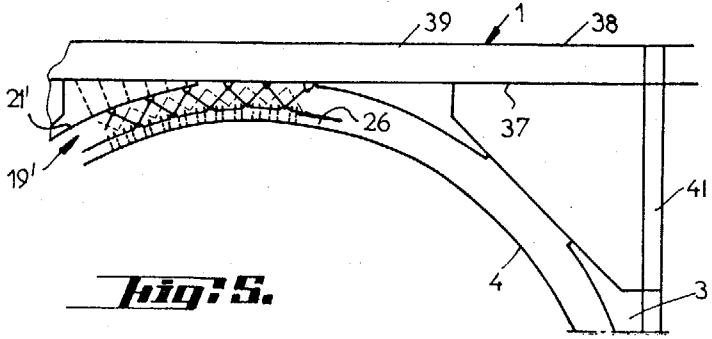
FIG. 5 is a fragmentary top view [to] *at* a smaller scale, of a tank mounted in the ship's hold with a said device according to one modified form of embodiment.

FIGS. 5, 6 and 7 illustrate a modified form of embodiment wherein each system of bearing members 19′, 20′ is at a level at least close to the horizontal plane of symmetry or equatorial plane 18 of the tank 4 and the systems 19′ and 20′ are in fact arranged as close as possible to one another and have for instance their rings 26 carrying the guiding bearings arranged respectively above and below the [hinge] yokes *for pivotal connection* 12 for the vertical suspension rods 10 by being placed [against] *adjacent to* the said yokes which thus serve as distance-pieces for the rings 26 as shown in FIG. 7. In this example, both rods 28′, 29′ of each bearing member 23′ are [hingedly] *pivotally* mounted for instance substantially in coaxial relationship on their associated guiding element 24′ which comprises to this end two aligned, mutually opposite pivot pins 33, i.e. an upper pivot pin and a lower pivot pin which are substantially vertical and serve as hinge pins by being engaged in corresponding end eyes 34 at the ends of the rods 28′ and 29′. It is seen that both rods 28′, 29′ of each bearing member 23′ are vertically [shifted] *spaced* with respect to one another, so that their ends 34 [hinged] *pivoted* on the common guiding element 24′ are superposed. The portion of the guiding element 24′ which is located between two pivot pins 33 [are] *is* preferably *in the shape of a* square or rectangular parallelepiped [shaped] slidingly mounted in the guiding bearing 25. Both adjacent rods 29′, 28′a or 29′b, 28′ of two successive bearing members 23′ of one and the same system 19′ or 20′ are [hingedly] *pivotally* connected with the stationary structure 21′, 22′ by having for instance their adjacent ends in mutual superposition about one and the same vertical [hinge] *pivot* pin 35 mounted in a common yoke solid with the said stationary structure. As already indicated previously, if the tank 4 is to contain for instance liquefied gases at very low temperatures, the tank and all its bearing members 19, 29 or 19′, 20′ and all its suspension members 9 are made from a metal capable of withstanding low temperatures, whereas heat-insulating means are interposed in the connections of the said members with the stationary structures 21, 22 or 21′, 22′ supporting them. In the example considered, the stationary structure yokes 21′, 22′ supporting the *pivot* [hinge] pins 35 and the corresponding ends of the rods 28′, 29′ are made for instance from ordinary structural steel, whereas all the other [pieces] *parts* or portions shown in particular in FIG. 7 are made from noble steel, for instance from stainless steel, and heat-insulation with respect to the stationary strucure 1, 21′, 22′ is [ensured] *provided* by sleeves 36 made from heat-insulating material and supported by the yokes of the stationary structures 21′, 22′ and in which *sleeves* are mounted the [hinge] *pivot* pins 35.

As the systems of bearing members 19′ 20′ are near to the equatorial plane 18 of the tank 4, it is necessary to provide for a greater spacing between the guiding bearings 25 and the tank 4 in order to avoid any interference, in particular with the rods 10 of the vertical suspension supports 9. It should be noted in this connection that the first form of embodiment illustrated respectively in FIGS. 1 to 4, is more advantageous, to a certain extent, than the second form of embodiment illustrated in FIGS. 5 to 7. Indeed, in the first form of embodiment the stresses are less concentrated in proximity to the equatorial plane than in the second form of embodiment in which they combine with the stresses resulting from the vertical suspension. On the other hand, a better balancing of the respectively upper and lower tank halves or hemispheres is obtained in the first form of embodiment owing to the greater vertical spacing of the system of bearing members 19, 20. Lastly, in the first form of embodiment, since the systems of bearing members 19, 20 are located outside *of* the region of where the vertical suspension supports 9 are arranged, the points of application of the bearing reactions through the medium of the co-operation of the guiding elements 24 and the guiding bearings 25 are closer to the wall of the tank 4, thus resulting in a reduction of undesired residual torques in the wall of the tank as compared with the second form of embodiment.

It is seen that in the second form of embodiment, the bearing members of the lower system 20′ are [shifted] *offset* in the peripheral direction with respect to the bearing members of the upper system 19′ in the same manner as in the first form of embodiment. The [hinge] *pivot* pins 11 of the vertical suspension rods 10 are located substantially in the equatorial plane of the tank 4. Irrespective of the said shift in the peripheral direction, the two superposed system of bearing members 19, 20 or 19′, 20′ are preferably substantially identical in both forms of embodiment and the vertical pins of the guiding elements of both systems are advantageously located substantially on one and the same cylindrical surface concentric with the axis of revolution 7 of the spherical tank 4.

In FIGS. 6 and 7 it is observed that in this form of embodiment the rings 26 carrying the bearings are radially wider than in the preceding form of embodiment, so that it is necessary to provide in the upper ring 26 openings 40 enabling the suspension rods 10 closest to the tank to be freely passed therethrough, whereas the suspension rods 10 farthest from the tank *extend* [pass] outside *of* the upper ring 26. FIG. 5 shows a top view of the compartment of the hold 3 defined on the one hand by at least one transverse partition forming a cofferdam 41 and on the other hand by the wall of the double hull 1 of the ship, vessel or boat comprising an inner planking 37 and an outer planking 38 defining therebetween an intermediate space 39 forming for instance a lateral [ballasting container] *ballast tank.*

Of course, the invention is by no means limited to the forms of embodiment described and illustrated which have been given by way of example only. In particular, it comprises all the means constituting technical equivalents to the means described as well as their combinations, should the latter be carried out according to the [spirit] *gist* of the invention.

What is claimed is:

1. An auxiliary device for supporting a tank against roll and pitch and associated with a system of main movable and substantially vertical suspension supports, said device comprising at least one set of stationary bearing members substantially adjacent to one another and distributed along the periphery of said tank at least approximately in one and the same relative horizontal plane, each bearing member comprising a substantially triangular bracket support comprising in particular two overhanging rods, a stationary external structure spaced from said tank, [respectively at two, at least horizontally spaced points of the tank located respectively on either side of the normal relative vertaical plane passing through said member], one of the ends of said rods being connected to said structure, said rods *projecting respectively from two at least horizontally spaced points of said structure located respectively on either side of the normal relative vertical plane passing through said member and said rods* converging towards said plane, a guiding element interconnecting the other ends of said rods in said plane, a [force-] *forced* guiding bearing solid with said tank with which said element cooperates, each guiding bearing having a guiding path forming a slideway constituted by a rectilinear elongated recess forming a substantially horizontal straight lot with parallel opposite edges, the longitudinal plane of symmetry of said slot being in said normal relative vertical plane, said guiding element constantly engaging said slideway with bilateral contact while moving in said normal relative vertical plane.

2. A device according to claim 1, wherein the bearing members located at one and the same level are substantially adjacent to one another and the adjacent rods of two successive bearing members are connected with said stationary structure at two at least adjacent points.

3. A device according to claim 1, wherein each guiding element is constituted by a sliding block-forming pad at least that portion of which engages said slideway has a substantially prismatic lateral surface, the axis of which is substantially vertical and the cross-section of which is rectangular and the vertical length of which is sufficient to constantly ensure the guiding of any mutual relative vertical displacement of said guiding element.

4. A device according to claim 1, wherein both of said rods of each bearing member have at least their respective points of connection with said stationary structure located at two respectively different levels and are substantially horizontal and [shifted] *spaced* vertically, so as to be located on either side of the horizontal plane containing the associated guiding bearing.

5. A device according to claim 4, wherein said two rods of each bearing member are [hingedly] *pivotally* connected in substantially coaxial relationship, with the associated guiding element, comprising to this end two mutually opposed pivot pins which are aligned and substantially vertical and serve as hinge pins, each of said rods being [hingedly] *pivotally* connected also with said stationary structure about respective, substantially vertical [hinge] *pivot* pins.

6. A device according to claim 4, wherein two adjacent rods of two successive bearing members of one and the same system are offset vertically with respect to one another.

7. A device according to claim 6, wherein two adjacent rods of two successive bearing members of one and the same system are [hingedly] *pivotally* connected with said stationary structure in mutual superposition about one and the same vertical [hinge] *pivot* pin mounted in a common clevis.

8. A device according to claim 6, wherein each rod of each said bearing members is rigidly secured [by] *with* its opposite ends [respectively] to the associated guiding element and to said stationary structure.

9. A device according to claim 1, wherein at least two sets of said bearing members are arranged at two levels located symmetrically on either side of an horizontal plane of symmetry of said tank, said bearing members being respectively shifted in the peripheral direction from one level to the other.

10. A device according to claim 9 [characterized in that] *wherein* said guiding bearings of one and the same system of bearing members located at one and the same level are carried by a substantially horizontal ring solid with said tank and surrounding the latter externally, each guiding bearing being constituted by a recess provided in said ring.

11. A device according to claim 9, wherein said tank and all of its bearing and suspension members are made from a metal capable of withstanding low temperatures [whereas] *and including* heat-insulating means interposed in the connections of said members with the stationary structures supporting them.

12. A device according to claim 9, for a tank mounted in the hold of a cargo ship having a main deck wherein said two sets of bearing members comprise an upper set and a lower set placed respectively at two superposed levels, symmetrical with respect to the said horizontal plane of symmetry of the said tank, the upper set being substantially at the level of said main deck of said ship.

13. *An auxiliary device for constraining a tank against roll and pitch and associated with a system of essentially weight-bearing substantially vertical supports, said device comprising at least one set of keying means distributed about the periphery of said tank at least approximately on a same horizontal level, each keying means being at least approximately symmetrical with respect to a vertical centre plane locally normal to the wall surface of said tank, and comprising: a stationary structure arranged outside of and spaced from said tank; a key member carried by said structure and projecting therefrom substantially horizontally towards said tank; key-way defining means integral with and projecting outwards from said tank and co-operating with said key member in forced guiding relationship, said key member including a terminal slide-block portion formed with substantially flat, vertical, opposite, side faces located on either side of said vertical plane of symmetry, said key-way defining means being formed with an elongated, substantially straight slot forming a vertical through-passageway and extending outwards from a closed end thereof near said tank to its opposite open end remote from said tank, said slot being open at its top and bottom and having opposite edges forming vertical side wall portions located on either side of said plane of symmetry, said slot being constantly engaged in sliding relationship by said slide-block portion and reciprocally movable through thermal expansion and contraction of said tank horizontally inwards and outwards vertically upwards and downwards in either direction relative to said slide-block portion with two degrees of freedom of motion in substantially parallel relation to said vertical local plane of symmetry.*

References Cited

The following references, cited by the Examiner, are of record in the patented file of this patent or the orginal patent.

(References on following page)

UNITED STATES PATENTS

| | | | |
|---|---|---|---|
| 3,425,583 | 2/1969 | Bridges | 114—74 A |
| 3,280,778 | 10/1966 | Leathard | 114—74 A |
| 3,623,626 | 11/1971 | Bridges | 114—74 A |
| 3,152,713 | 10/1964 | Clifford | 220—15 |
| 2,545,686 | 3/1951 | Collins | 220—15 |
| 2,798,364 | 7/1957 | Morrison | 114—74 A |

| | | | |
|---|---|---|---|
| 2,926,810 | 3/1960 | Yeager | 220—15 |
| 3,251,501 | 5/1966 | Mesnager | 220—15 |
| 3,583,352 | 6/1971 | Alleaume | 114—75 A |

TRYGVE M. BLIX, Primary Examiner

S. M. GOLDSTEIN, Assistant Examiner